US012751463B2

(12) United States Patent
Pedroia

(10) Patent No.: US 12,751,463 B2
(45) Date of Patent: Oct. 6, 2026

(54) METHOD FOR PRODUCING A PRODUCT CONTAINING FOOD IN A SKIN

(71) Applicant: PEME SA, Quartino (CH)

(72) Inventor: Stefano Pedroia, Minusio (CH)

(73) Assignee: PEME SA, Quartino (CH)

( * ) Notice: Subject to any disclaimer, the term of this patent is extended or adjusted under 35 U.S.C. 154(b) by 0 days.

(21) Appl. No.: 18/290,959

(22) PCT Filed: Jul. 22, 2022

(86) PCT No.: PCT/EP2022/070574
§ 371 (c)(1),
(2) Date: Jan. 22, 2024

(87) PCT Pub. No.: WO2023/001998
PCT Pub. Date: Jan. 26, 2023

(65) Prior Publication Data
US 2024/0365799 A1 Nov. 7, 2024

(30) Foreign Application Priority Data
Jul. 22, 2021 (DE) ..................... 10 2021 118 996.9
May 4, 2022 (DE) ..................... 10 2022 110 969.0

(51) Int. Cl.
*A22C 11/12* (2006.01)

(52) U.S. Cl.
CPC ............ *A22C 11/127* (2013.01); *A22C 11/12* (2013.01)

(58) Field of Classification Search
CPC ...... A22C 11/12; A22C 11/122; A22C 11/127
USPC ..................................................... 452/48, 51
See application file for complete search history.

(56) References Cited

U.S. PATENT DOCUMENTS 2,949,630 A * 8/1960 Sachsenroder, Sr. ........................ B65B 13/265 452/48
4,401,329 A * 8/1983 Pedroia ................ A22C 11/122 452/48
4,541,660 A * 9/1985 Pujol .................... A22C 11/122 289/2
5,928,737 A * 7/1999 Hammer ............ A22C 13/0013 426/138
7,479,057 B2 * 1/2009 Waldstaedt .......... A22C 11/105 452/32
10,973,234 B2 * 4/2021 Domlatil ................ A22C 11/12
(Continued)

FOREIGN PATENT DOCUMENTS

DE 102017115090 A1 12/2018
EP 1053683 * 11/2000
(Continued)

OTHER PUBLICATIONS

International Search Report and Written Opinion dated Nov. 11, 2022 for corresponding application PCT/EP2022/070574.
(Continued)

*Primary Examiner* — David J Parsley
(74) *Attorney, Agent, or Firm* — Bachman & LaPointe, P.C.

(57) ABSTRACT

In a method for producing a product, containing a food in a skin, on a string, wherein successive products are separated from one another by a tie-off region, a taut thread should be wound around the tie-off region, multiple times over its length, and the thread should be continued from product to product.

18 Claims, 2 Drawing Sheets

(56) References Cited

U.S. PATENT DOCUMENTS

| | | | | |
|---|---|---|---|---|
| 11,445,731 | B2 * | 9/2022 | Pedroia | A22C 11/122 |
| 2007/0254571 | A1 * | 11/2007 | Gladh | A22C 11/104<br>452/32 |
| 2021/0282417 | A1 * | 9/2021 | Veldkamp | A22C 11/008 |

FOREIGN PATENT DOCUMENTS

| | | | |
|---|---|---|---|
| EP | 0865732 | B1 | 1/2002 |
| EP | 3545768 | A1 | 10/2019 |
| EP | 3497157 | B1 | 9/2020 |
| SU | 435803 | A1 | 7/1974 |
| WO | 8707240 | A1 | 12/1987 |
| WO | 2018234520 | A1 | 12/2018 |

OTHER PUBLICATIONS

German Office Action dated Nov. 24, 2021, issued in corresponding application DE 102021118996.9.

* cited by examiner

METHOD FOR PRODUCING A PRODUCT CONTAINING FOOD IN A SKIN

TECHNICAL FIELD

The invention relates to a method for producing a product, containing a food in a skin, on a string.

PRIOR ART

The present invention relates to the production of food products in general. In this case, the focus is in particular on liquid food products, such as soups. Hitherto, these are packaged for example in a pouch, and put into the microwave for preparation. In this case, packaging said food requires a significant time investment.

Production methods which were used hitherto for filling sausages on a string cannot be readily applied generally to food, since in most known methods a twist-off or tie-off region is produced between the individual sausages, which is secured by a metal clip. However, as a result said products cannot thus far be re-heated in the microwave.

Tie-off machines of the present type for sausages are known and commercially available in a range of forms and embodiments. For example, the EP 0 865 732 B1 describes a machine for automatically tying a meat mass filled in a sausage skin by means of a cord, with a spool on which the tying cord is wound, a mechanism for constricting the filled sausage skin at the tying point and for forming the constriction, and a mechanism for applying at least one cord winding at the tying point while the filled sausage skin is stationary. The spool which carries the tying cord should be arranged coaxially with the axis of symmetry of the filled sausage skin and be provided in its center with an axial passage opening, the diameter of which is sufficiently large to allow the filled sausage skin to pass through.

In the EP 1 053 683 A2, the entire rotor housing is moved, creating a gap between two sausages. The axial movement is also performed by a pneumatic cylinder. During the axial movement of the rotor housing, the rotor is in turn stopped in its rotational movement.

This constant stopping and accelerating of the rotor causes a high level of wear, particularly on the drive belts, which impairs production reliability and increases running costs.

A device and a method for tying a mass filled in a skin are known from the applicant's own EP 3 545 768 A1. This takes place at designated tying points with a thread. The device comprises a rotor and a guide device connected to the rotor for guiding the thread, wherein the rotor has a receiving section for receiving several windings of the thread. The main purpose is to produce the tying points before and after a sausage, whereby the rotor is moved in different directions of rotation.

Reference is made in particular to EP 0 865 732 B1. In the case of the tie-off machine described there, sausages are tied off at a constant spacing. In this case, what is known as double tie-off is used. In the case of double tie-off, usually two pairs of displacer pliers work together. The first pair is designed to be stationary, while the second pair is located on a carriage such that it is movable along the tie-off region. Said carriage is displaced by means of an actuating piston. The tie-off region is formed by two tie-off points, wherein after creation of the first tie-off point a rotor for supplying the tie-off thread has to be stopped until the sausage has been moved further in the conveying direction and said rotor then creates the second tie-off point.

A further problem is that product residue remains between the first and the second tie-off point, in the tie-off region, which residue is associated with significant hygiene problems after the sausage has been cut off.

SUMMARY OF THE INVENTION

The problem addressed by the present invention is that of eliminating the above-mentioned disadvantages and in particular of significantly accelerating the production of food products and simplifying the preparation of said food products.

The features disclosed herein lead to the solution of the problem. Filling machines for filling sausage meat in a sausage skin can also be used for filling any desired food into another skin for producing said food on a string. In particular in this case filling with soups is intended, but the invention is applicable to any other flowable food.

Tying-off with a thread, for example a textile thread, as the significant advantage that the food, tied off in the skin, can for example be placed in a microwave and heated there. In practice, it has been found that the firmly tied-off tie-off region between two products leads to sufficient sealing tightness. In order to use the food, the user then merely has to grip the thread on the last product and pull it, such that the thread untwists on its own and the product contents can be put into a container for example.

Said thread is wound around the tie-off region in such a way that it displaces as much food as possible, which may be located between the two tie-off points, before the second tie-off point is created. This takes into account the significantly increased hygiene requirements.

According to the present invention, a thread is intended to mean any elongate element which can be wound around the tie-off region, no matter what its material or structure. In this case, the scope of the present invention is also intended to cover the situation where the creation of the tie-off points takes place separately from the winding around the tie-off region. This could even be achieved by different threads, but it is of course preferable, within the scope of the present invention, for the tie-off points and the winding of the tie-off region to take place using the same thread and the same rotor.

Any possible and conceivable thread feed means is covered by the scope of the present invention. Usually this will be a rotor known from the prior art, which winds the threads around the tie-off points and the tie-off region. Said thread feed means is accelerated to maximum speed at the first tie-off point and creates the first tie-off point by winding the thread multiple times around the tie-off region. Thereafter, the product is drawn further in the conveying direction, along the tie-off region, for creating a predefined number of windings, wherein this takes place at a speed which is synchronized with the speed of the rotor of the thread feed means, in order that a desired number of windings can be achieved. This can result in the rotor always rotating at a uniform high speed or in the rotation rate being reduced slightly in the case of a lower feed speed of the product.

Preferably, the entire process takes place in interaction with at least one, preferably two, displacers, wherein usually one displacer is stationary, and a second displacer is displaceable or at the start of the method carries along with it the skin, and thereafter an already finished product. The first, stationary displacer has the task above all of closing the product before the first tie-off point and displacing the product mass counter to the filling tube. For this purpose, the displacer comprises corresponding pliers or the like.

The second displacer surrounds the tie-off region after the first tie-off point, which is also preferably performed using corresponding pliers. Said displacer is then moved in the conveying direction of the string, for creating the first tie-off point, and in the process carries along the skin or the created product. As a result, the tie-off region is created, wherein in the case of a preferably not entirely closed first displacer some food is already displaced back out of the tie-off region, counter to the filling tube. Upon reaching the first tie-off point the tie-off region is stopped again and the first tie-off point is created. The process now begins from the start.

The movement of the carriage comprising the second displacer is preferably performed by means of a servo drive, i.e. a drive of which the speed can be controlled, as is the case for example for an electric motor. The servo drive can be accelerated, slowed, stopped, and accelerated again. The way in which the movement is ultimately transmitted to the carriage is less important; the inventive concept covers both a spindle drive and a corresponding gearing or a linear drive. A servo drive of this kind enables the synchronization, described below, between the direction of rotation of the rotor with the tie-off thread, and the movement of the displacer.

What is essential in the case of the present invention is that the synchronization between the movement of the rotor with the tie-off thread, and the displacer movement, is designed such that a desired thread pitch can be created, in a targeted manner, between the two tie-off points, without the rotor stopping and only then the axial movement of the second displacer occurring. There is also no stopping between the first and the second tie-off, such that the wear, and thus also the running costs, can be reduced. Furthermore, by means of the synchronization both the number of windings around the tie-off region and the strength of the constriction of the tie-off region by the winding can be determined.

A particular emphasis of the present invention is also directed to taking into account two important parameters, specifically the skin type and the product quality. Above all, different strength values and stretching behavior are to be taken into account for the skins. In a simple embodiment a clear film is envisaged, but the scope of the invention is intended to cover all casings which are suitable for receiving food.

In the case of foods, of course the consistency, composition, etc. are to be taken into account. According to the present invention, the speed of the axial movement of the displacer, and also the acceleration of the rotor, should be determined and adjusted for these parameters.

The present invention provides that a camera is installed, for example in the region of the skin intake, on the rotor housing, which camera takes photographs of the skin and identifies the skin type with the aid of an artificial intelligence means. The artificial intelligence means can clearly assign objects by image comparison. The product quality can also be determined by a corresponding artificial intelligence means. Basic setting of the speed, deceleration and acceleration of the machine for individual foods, and optionally a traction which acts on the tie-off thread, is carried out with the aid of the identified skin type and the product quality. These values which are set are then stored for each food and can be retrieved.

BRIEF DESCRIPTION OF THE DRAWINGS

Further advantages, features and details of the invention emerge from the following description of preferred embodiments, and with reference to the drawings; in which.

DETAILED DESCRIPTION

Figure 1:
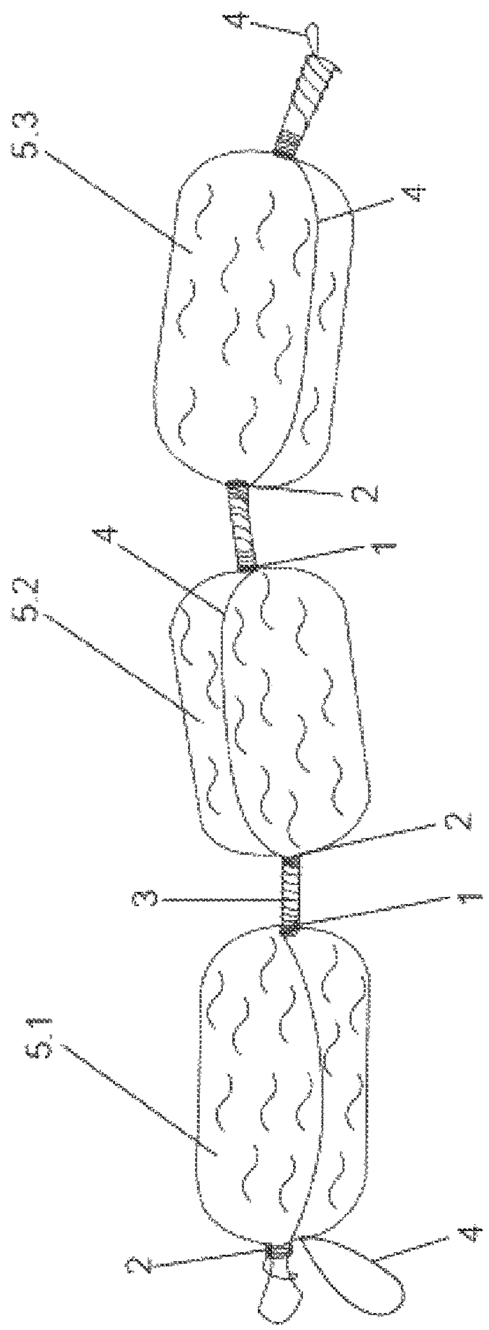
FIG. 1 is a plan view of three products in a product string.

A food for products 5.1 to 5.3 enters a skin 8 from a filling tube 7, which skin is pushed onto the filling tube 7 in a concertinaed manner. In this case, the skin 8 is held securely on the filling tube 7 by means of brake slips 9. In front of the filling tube 7, a bubble 10 comprising food forms in the skin 8.

In general, when creating the tie-off region now additionally two pairs of pliers-like displacers 11 and 12 are used. The front displacer 11 is stationary, while a rear, movable displacer 12 is mounted on a carriage (not shown in further detail) on which said displacer can be displaced, by means of a hydraulically or pneumatically actuated piston, for creating the tie-off region 3, wherein said displacer carries along the skin 8 at the start of the production, and subsequently also a product that is already produced.

In the present embodiment, the completed tie-off region 3 is created by a first tie-off point 1 and by a second tie-off point 2. This is achieved by means of a thread 4, which is wrapped around the tie-off region 3 by means of a rotor (not shown). In this case, a secure constriction is implemented at the tie-off points 1 and 2 and also along the tie-off region 3.

Figure 2:
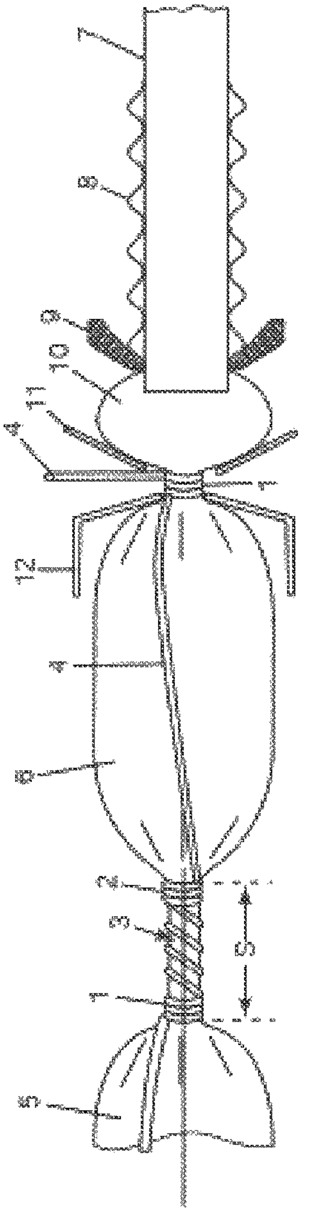
FIGS. 2 to 4 are schematic views of the creation of a tie-off region according to the present invention between products on a string, in different method steps.
Figure 3:
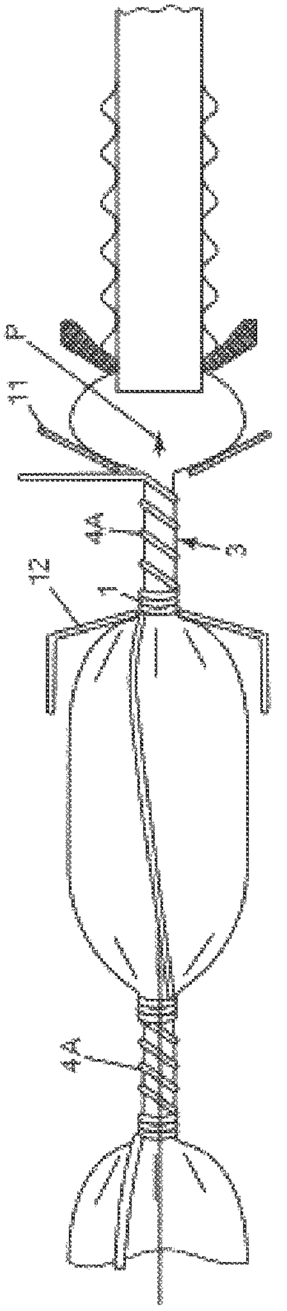

The method sequence is as follows:

In accordance with the present invention, according to FIG. 2 the tie-off point 1 is now created at maximum speed of the rotor and having a taut thread 4. Then, according to FIG. 3, the displacer 12 moves away from the stationary displacer 11, pulls the product with it, and forms the tie-off region 3, wherein food which is located in the tie-off region 3 is displaced through the closed claws of the displacer 11 in the direction of the arrow P according to FIG. 3, and into the bubble 10. This preferably takes place at a constant wrapping speed of the rotor and existing thread brake. In this way, the tie-off region is wrapped in a defined manner, which means that a predetermined number of windings 4A are laid around the tie-off region 3.

Figure 4:
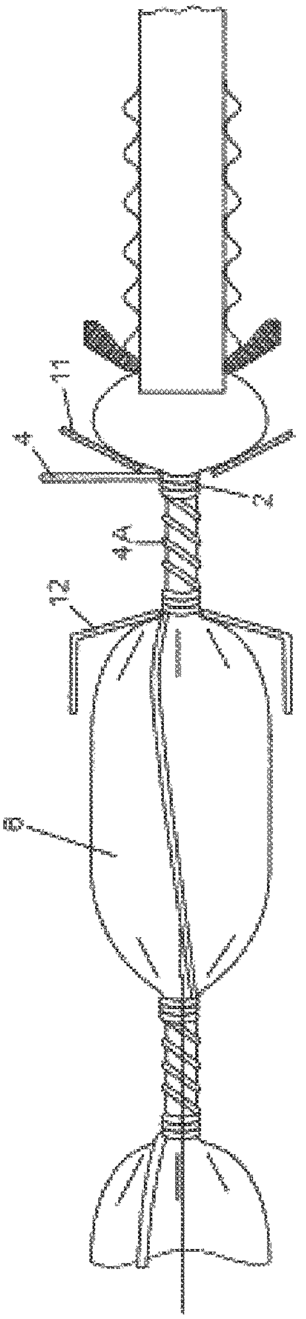

Thereafter, according to FIG. 4, the second tie-off point 2 is produced, at a preferably constant speed of the thread rotor and braking of the thread, in order that the tension is maintained.

After creation of the second tie-off point 2, the displacer 11 is opened and the product is pulled to the left by the displacer 12 for example, such that the filling tube 7 can fill the skin 8 with food for the next product. At the same time, the thread brake is opened, such that no thread is laid around the newly formed product, but rather the thread is guided along said product. When the desired length of the product has been achieved, the displacer 11 is closed again, the displacer 12 is opened and is returned to its initial position according to FIG. 2.

The movement of the second displacer 12 on its carriage is achieved by a hydraulic or pneumatic cylinder. The stroke between two end positions corresponds approximately to the spacing S. In the case of said movement, the second displacer 12 carries along the tip of the sausage skin 8 after the first tie-off point 1 or the sausage, in the conveying direction.

All the movements of the rotor both for creating the tie-off points 1 and 2 and the tie-off region 3, and also optionally the movement(s) of the displacer(s) 11 and 12 are generated by servo drives, as a result of which both the rotor and the displacer can be accelerated or braked in an exact manner.

This means that, according to the invention, the rotor can always rotate at maximum speed, and specifically while creating the two tie-off points 1 and 2 and while creating the windings 4A.

However, it is also conceivable that the first tie-off point 1 is created at maximum speed of the rotor, thereafter the rotor is moved along the tie-off region at a predetermined speed and optionally lower rotation rate, and only then, for creating the second tie-off point 2, is the rotor increased to maximum speed. The speed at which the rotor winds the tie-off threads around the tie-off region, for creating the tie-off point, may be different from that at which the windings 4A are created along the tie-off region. The rotor also does not need to be stopped upon reaching the second tie-off point 2, but merely the winding speed is increased.

By means of synchronization of the rotor movement with the tie-off thread, and the displacer movement along the tie-off region 3, the thread pitch between the two tie-off points 1 and 2 is thus specified in a targeted manner, without the rotor stopping and only then the axial movement of the second displacer along the twist-off point taking place. As a result, constant stopping and acceleration of the rotor is significantly reduced, which leads to substantially lower wear and associated running costs.

List of reference signs

| | | | | |
|---|---|---|---|---|
| 1 | 1st tie-off point | 34 | | |
| 2 | 2nd tie-off point | 35 | | |
| 3 | Tie-off region | 3 | | |
| 4 | Thread | 37 | | |
| 5 | Product | 38 | | |
| | | 39 | | |
| 7 | Filling tube | 40 | | |
| 8 | Skin | 41 | | |
| 9 | Brake slipper | 42 | | |
| 10 | Bubble | 43 | | |
| 11 | Displacer | 44 | | |
| 12 | Displacer | 45 | | |
| 13 | | 4 | | |
| 14 | | 47 | | |
| 15 | | 48 | | |
| 1 | | 49 | | |
| 17 | | 50 | 4A | Winding |
| 18 | | 51 | | |
| 19 | | 52 | | |
| 20 | | 53 | | |
| 21 | | 54 | | |
| 22 | | 55 | | |
| 23 | | 5 | P | Arrow |
| 24 | | 57 | | |
| 25 | | 58 | S | Length of 3 |
| 2 | | 59 | | |
| 27 | | 0 | | |
| 28 | | 1 | | |
| 29 | | 2 | | |
| 30 | | 3 | | |
| 31 | | 4 | | |
| 32 | | 5 | | |
| 33 | | | | |

The invention claimed is:

1. Method for producing a plurality of products (5.1-5.3), each containing a food in a skin (10), on a string comprising a thread, wherein successive products of the plurality of products (5.1-5.3) are separated from one another by a tie-off region (3) produced between two tie-off points (1, 2), comprising:

tying a first tie-off point (1) of the two tie-off points adjacent to a formed product of the plurality of products with a thread (4);

gripping the skin adjacent to the first tie-off point with a displacer (11);

pulling the formed product and first tie-off point (1) away from the displacer (11) to form the tie-off region (3) having a length (S), wherein the displacer (11) displaces food in the tie-off region (3) upwardly and away from the formed product;

wrapping the tie-off region with the thread during the pulling to further displace food in the tie-off region upwardly and away from the formed product; and tying off a second tie-off point of the two tie-off points (2) spaced along the tie-off region (3) by the length (S) from the first tie-off point (1); wherein winding the thread (4) around the tie-off region (3) multiple times over the length (S) in such a way that food which may be located between the first tie-off point and the second tie off point (1, 2), is displaced before the second tie-off point (2) is produced and said thread is continued from product (5.1-5.3) to product (5.1-5.3) of the plurality of products.

2. Method according to claim 1, wherein the same thread (4) is used for creating the two tie-off points (1, 2) and for winding around the tie-off region (3).

3. Method according to claim 1, wherein a thread feed means winds the thread (4) around the tie-off region (3) multiple times at the first tie-off point (1) of the tie-off region (3) for creating the first tie-off point (1), and then, for creating a predetermined number of windings (4A), a product (5.1-5.3) of the plurality of products that is being tied off is displaced along a conveying direction, and the second tie-off point (2) is created.

4. Method according to claim 3, wherein a winding speed of the thread feed means is constant both when creating the tie-off points (1, 2) and when winding around the tie-off region (3).

5. Method according to claim 3, wherein a winding speed of the thread feed means when creating the tie-off points (1, 2) is different compared with when creating the windings (4A) around the tie-off region (3).

6. Method according to claim 1, wherein the skin (8) consists of plastics material.

7. Method according to claim 1, wherein the skin (8) is a transparent skin (8).

8. Method according to claim 1, wherein the food is a liquid food.

9. Method according to claim 1, wherein the tie-off region (3) is created by the displacer (11) and a further displacer (12), wherein the further displacer (12) is used to pull the formed product and the first tie-off point (1) away from the displacer (11).

10. Method according to claim 9, wherein the displacer (11) constricts the tie-off region (3), in front of the first tie-off point (1) in a conveying direction.

11. Method according to claim 10, wherein after the first tie-off point (1) the product (5.1-5.3) is drawn further in the conveying direction, by the further displacer (12), for creating the tie-off region (3).

12. Method according to claim 11, wherein the winding step is carried out while the product (5.1-5.3) is drawn further between the further displacer (12) and the displacer (11).

13. Method according to claim 12, wherein the second tie-off point (2) is created in front of the displacer (11).

14. Method according to claim 11, wherein movement of the further displacer (12) and movement of a thread feed means are synchronized.

15. Method according to claim 1, wherein a skin type is determined by a camera, which is connected to artificial intelligence, and thereafter the movement of the thread feed means and/or displacers (11, 12) is determined.

16. Method according to claim 15, wherein the camera is arranged on a rotor housing, in a region of an intake for the skin.

17. Method according to claim 9, wherein the movement of the further displacer (12) takes place using a servo drive.

18. Method according to claim 17, wherein movement of a rotor and the further displacer (12) is synchronized.

* * * * *